United States Patent [19]

Lehnhart

[11] 4,048,703
[45] Sept. 20, 1977

[54] COLLAR SLEEVES AND PROCESS AND TOOL FOR THE MANUFACTURE THEREOF

[76] Inventor: Dieter Lehnhart, Mainz (Rhine), Germany

[73] Geyco-Metall-Werke Daeleh & Loos GmbH, Germany

[21] Appl. No.: 549,953

[22] Filed: Feb. 14, 1975

[51] Int. Cl.² ............................................. B21D 53/10
[52] U.S. Cl. ........................... 29/149.5 DP; 308/237 R
[58] Field of Search ............... 29/149.5 DP, DIG. 43, 29/149.5 R

[56] References Cited

U.S. PATENT DOCUMENTS

| 325,692 | 9/1885 | Parker | 29/DIG. 43 |
|---|---|---|---|
| 652,845 | 7/1900 | Halifax | 29/149.5 |
| 1,000,122 | 8/1911 | Reynolds | 29/DIG. 43 |
| 1,441,459 | 1/1923 | Small | 29/149.5 C |
| 1,882,352 | 10/1932 | Woodhead et al. | 29/DIG. 43 |
| 2,078,195 | 4/1937 | Cornell, Jr. | 29/DIG. 43 |
| 2,177,584 | 10/1939 | Salansky | 29/149.5 C |
| 2,344,285 | /1940 | Cormode | 78/63 |
| 2,674,782 | 4/1954 | Surtees | 29/149.5 C |
| 2,722,047 | 11/1955 | Cousino | 29/149.5 |

FOREIGN PATENT DOCUMENTS

| 119,096 | 11/1944 | Australia | 29/DIG. 43 |
|---|---|---|---|
| 1,066,548 | 1/1954 | France | 29/149.5 DP |
| 722,260 | 1/1955 | United Kingdom | 29/149.5 DP |

Primary Examiner—C.W. Lanham
Assistant Examiner—V. K. Rising
Attorney, Agent, or Firm—Strauch, Nolan, Neale, Nies & Kurz

[57] ABSTRACT

Collar sleeves lined with bearing material are manufactured by axially upsetting a prepared cylindrical sleeve in a die assembly tool that permits and controls axial thickening of the sleeve wall in the region of the desired collar.

5 Claims, 6 Drawing Figures

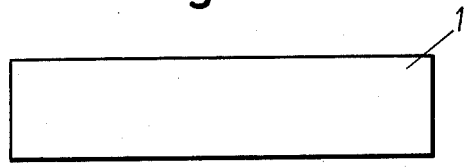
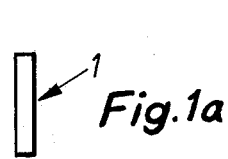
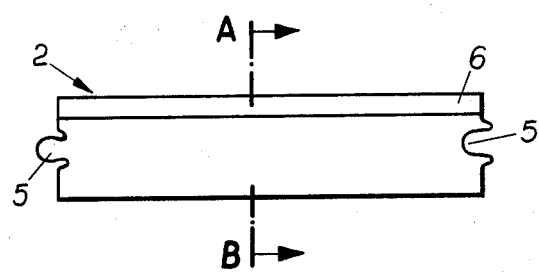
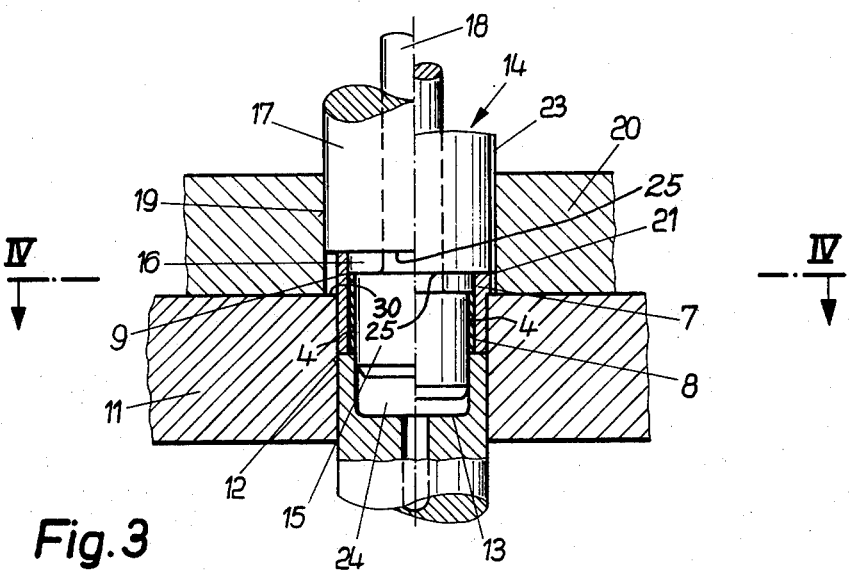
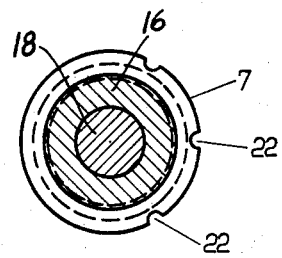

COLLAR SLEEVES AND PROCESS AND TOOL FOR THE MANUFACTURE THEREOF

This invention relates to the manufacture of sleeves, particularly to slide bearing or housing collar sleeves having integral small collars of random thickness, and to methods and apparatus for their manufacture.

When housing sleeves or bearing sleeves, serving for radial support of rotating engine and/or vehicle parts that are pivotable through a certain angle or shiftable in the axial direction, are to be prevented from undesired axial shifting in a housing, they are provided with a collar. For forming an integral collar on a sleeve it is common practice to deform a conical body gradually into a cylindrical sleeve having the collar, the sleeve being subjected to a circumferential material compression increasing from the free end to the collar, and to a more or less high circumferential and radial material tension (DT-OS 1,957,703). This known process is relatively complex and expensive, and the so-manufactured collar sleeves do not always meet use requirements. For the manufacture of slotted collar sleeves it is, furthermore, common practice to provide recesses in the sleeve and/or collar end, to be able to bend the collar sleeve out of a plate (DT-OS 1,625,626). However, such collar sleeves may exhibit undesired additional slits or notches in the sleeve end, may form only an incomplete collar composed of parts that look like lugs, or even may have both disadvantages.

These known processes can be utilized only if the collar diameter exceeds the outside diameter of the sleeve end by not less than three times the wall thickness; and the collar thickness is as thick as or thinner than the sleeve wall thicknss. When the difference between the collar diameter and the sleeve outside diameter is less than three times the wall thickness, and the collar thickness is very different from the sleeve wall thickness, it was previously necessary to manufacture the collar apart from the sleeve and to bring both together afterwards by friction welding, adhesive or by means of latches or lappings, or a massive sleeve blank had to be machined to form the collar.

The present invention avoids the aforementioned expensive manufacturing methods and makes simple and inexpensive manufacture of collar sleeves possible, especially slide bearing and housing sleeve with small collars of random thicknesses, whereby a high precision, good stability and is used as slide bearing sleeves unchanged good bearing properties are achieved. This problem is solved in the present invention by the collar being formed by controlled axial upsetting of the sleeve.

It is common practice to produce shaped bodies out of steel, aluminum, lead and zinc by cold extrusion, the extrusion of steel causing particular problems (see Dubbel, "Taschenbuch fur den Maschinenbau", volume 2, 2nd edition 1972, pp. 652,653). Cold extrusion processes cannot be applied to the manufacture of housing sleeves or slide bearing sleeves with integral collars, because it is impossible to achieve the properties required for such workpieces. On the other hand, the sleeves with collars made by axial upsetting show all of the properties desired for the relevant applications.

Sleeves according to the present invention can be designed with or without a butt joint. If the collar and the part disposed in the slide bearing or housing have a continuous butt joint, such collar sleeves can be rolled out of a plate and the collar formed afterwards. In the butt joint of some such sleeves at least one clinch connection may be provided, although other modes of securing the butt joint may be used.

Of special advantage within the present invention is that the sleeve part is calibrated by the axial upsetting operation.

By the present invention contours can be provided on the sleeve or collar, especially on the outside surface.

The sleeve part itself may have a coating consisting of one or several layers adapted to the desired use, for example, a slide bearing layer. Here the collar end, upset in axial direction, can remain free from a coating on its inside surface at the collar region. This can be advantageous when the coating to be applied on the inside surface of the sleeve loses it adhesive to the substrate when axial upsetting is taking place in the collar area.

In contrast to the shapes made by cold extrusion, the load-bearing material of the collar and the housing part in the present invention can be steel.

For the manufacture of sleeves according to the present invention it is quite useful to apply a process where the collar is shaped by axial upsetting a cylindrical sleeve prepared by conventional methods. By this process practically only the collar area is subjected to upsetting while the sleeve itself is not changed in its desired properties during the shaping of the collar.

Within the present invention it is of special advantage if during axial upsetting of the collar the cylindrical part is calibrated in an annular receptacle. The calibration of the sleeve part during upsetting of the collar not only offers substantial process-technological advantages but also a specially good transition or properties in the upset collar and in the cylindrical part, when upset to a lower degree.

In a particularly advantageous design of the process according to the present invention, a cylindrical sleeve is formed out of a plate, e.g. bent or rolled. Hereby it is possible to start with any composite plate, preferably of steel covered by another metal like bronze, babbit or aluminum, or in certain cases even with plastics. Unless the coating of such composite plates is suitable for severe axial upsetting, it is advisable to remove the coating from the plate in an area provided for forming the collar before forming the cylindrical sleeve.

One phase of the present invention is a special tool for upsetting a collar on a cylindrical sleeve by the above described process. Such a tool is characterized by a calibrated cylindrical bore for inserting the prepared cylindrical sleeve in a workpiece receptacle together with an axial upsetting counter-die, and by an upsetting die penetrating into the bore of the receptacle the die on its front end including a calibrating mandrel extending into the cylindrical sleeve, and being supported and shiftable in axial direction in a collar-forming die which is centered on the receptacle. Such a tool according to the present invention may upset in one single step the collar to be formed on the prepared cylindrical sleeve.

The sleeve part can be calibrated at the same time together with the upsetting of the collar in the same tool and the same operational step, if the calibrating mandrel is guided on its front end in the counter die. Here it is useful to mount the counter die so as to be axially shiftable in the calibrated bore of the workpiece receptacle and acting as an ejector for the finished collar sleeve.

The upsetting die can be composed of several components: a calibrating mandrel, an annular counter die acting radially on the inside surface area of the collar, and an upsetting die acting axially. If it is desired to provide a contour on the outside circumferential surface of the collar, it is possible to furnish the upsetting die and the forming die for the circumferential collar surface with elements that form the desired contour during the upsetting operation.

BRIEF DESCRIPTION OF THE DRAWINGS

FIG. 1 is a plan view showing a plate to be used for the manufacture of a sleeve according to the present invention;

FIG. 1A is a section across the plate of FIG. 1;

FIG. 2 is a top plan view showing a modified plate of composite material to be used for the manufacture of a sleeve according to the present invention;

FIG. 2A is a section on line A-B of FIG. 2;

FIG. 3 is a schematic section in axial direction of a tool according to the present invention for upsetting a cylindrical sleeve to form a small collar of random thickness; and FIG. 4 is a section substantially on line 4—4 of FIG. 3.

A collar sleeve according to a preferred embodiment is manufactured as follows:

First, a rectangular plate 1 is cut out of a sheet or plate of the desired material, for example ferrous or non-ferrous metal. FIG. 1 shows such a plate 1 in its most simple design. It is also possible to cut a rectangular plate 2 out of composite material. Such a composite plate can include for example a substrate 3 of steel and a single or multi-layer coating 4 of any kind of material according to the intended use of the sleeve, such as a bearing metal which is softer than the steel or other substrate. The coating may consist of for example bonded-on bearing metal or of a bearing surface built up of plastics.

FIG. 2 further shows a possiblity for plate 2 to be pre-shaped on its shorter edges with interfitting elements 5 for a clinch connection when the plate is curved into sleeve form. FIG. 2 also shows the coating 4 removed in the band-shaped area 6 where the collar is to be formed. If however the coating 4 can withstand the stresses developed during upsetting of the collar without being damaged severely, the coating 4 may also remain in the area 6.

Plates 1 or 2 are formed into prepared cylindrical sleeves by conventional methods, e.g. by bending or rolling and butt welding or otherwise fixing the opposite ends in abutment. As shown in FIG. 2, clinch elements 5 may engage with each other to complete the prepared sleeve.

These prepared sleeves which are cylindrical and of substantially uniform radial thickness are then formed with a collar 7, as by the tool shown in FIG. 3. As FIG. 3 illustrates this tool comprises a stationary workpiece receptacle 11 containing an accurately calibrated cylindrical bore 12 for receiving the prepared cylindrical sleeve. Also as shown in FIG. 3, a counter die 13 slidably enters the bore 12 from below, fitting exactly and so forming an abutment for the lower end of sleeve 9 in bore 12.

An upsetting die assembly 14 interacts with the receptacle 11, the die assembly 14 being composed of several parts, namely a cylindrical calibrating mandrel 15, a cylindrical annular counter die 16 acting within the area of the collar to be upset, and the cylinrical upsetting die member 17 itself. The die member 17, mandrel 15 and the counter die 16 are fixedly mounted on the axially movable calibrating stud 18. The upsetting die assembly 14 is thereby movable in the axial direction during upsetting.

The upsetting die member 17 is axially slidably guided in the bore 19 of a stationary forming die 20 centered on the workpiece receptacle 11. Bore 19 is of larger diameter than bore 12 as shown in FIG. 3. This bore 19 may provide those projections and recesses 21 which are necessary for radial shaping of a collar with contours and profiles 22, e.g. lugs, radii, openings, support cams, collets, grooves, pockets, spot faces, chamfers and sliding surface recesses.

Naturally, the corresponding counter contours 23 must be provided on the periphery of die member 17. The upsetting die assembly 14 has exact axial guidance in the forming die bore 19. An additional exact guidance is rendered to the upsetting die assembly 14 by a guide recess 24 in the face of the counter die 13, slidably receiving the front end of the calibrating mandrel 15 during shifting of the upsetting die assembly 14. Axial shaping is possible in the same way by an appropriate design of the cylindrical die member 17.

After having inserted the prepared cylindrical sleeve into the bore 12 of the workpiece receptacle 11, the upsetting die assembly 14 is lowered into the forming die 20 and into receptacle 11. The upsetting die assembly 14 is now guided accurately axially towards prepared sleeve 9 down into the smoothly fitting guide recess 24 of the counter die 13, and consequently the cylindrical counter die 16 will be disposed with a sliding fit inside the end of the sleeve 9 at the area of the collar to be formed as shown in the left side of FIG 3. An axially facing surface 25 engages the upper end of sleeve 9 as shown in FIG. 3. During further advancing of the upsetting die 14, the sleeve 9 between the upsetting die assembly 14 and the counter die 13 is axially compressed, the lower sleeve part 8 being radially confined between the calibrating mandrel 15 and the bore 12.

An upsetting deformation takes place in the part of the sleeve projecting above the top surface 30 of workpiece receptacle 11, the material there being deformed radially outwardly to a form a collar 7 up to the inside surface of bore 19. The counter die 13 can be adjustably located in accordance with the axial length of the sleeve. It is also possible to let the upsetting die 14 and the counter die 13 counteract during the upsetting operation. After finishing the collar sleeve, the counter 13 is, finally, used for ejecting the finished workpiece out of the calibrating bore 12, after the die assembly 14 is removed.

Any suitable means (not shown) may be provided for moving the die parts 13 and 14 toward each other with upsetting pressure.

It will be noted that during the axial upsetting operation, any increase in radial thickness of the lower part of sleeve 9 is determined by the relative diameters of the coextensive cylindrical surfaces of mandrel 15 and bore 12. Where no increase in radial thickness is desired the lower part 8 of the prepared sleeve will have a smooth fit between the surfaces with only sliding clearance. If some radial expansion is permissible or desired the accurately diametered mandrel and bore surfaces are formed accordingly.

In any event the radial space between the coextensive cylindrical surface of counter die 16 and bore 19 is of greater thickness than that around the lower part 8, so that as axial compression of the sleeve takes place the material in the upper end region may flow or be displaced to greater radial thickness thereby forming collar 7 on the sleeved region above surface 30 as shown in the right side of FIG. 3.

The above described process and the upsetting tool shown in FIG. 3 can be applied correspondingly or virtually in the same way if the prepared sleeve to be manufactured does not exhibit any axial butt joints, as for example a sleeve cut out of a seamless tube made of brass, steel etc. Coatings to be applied on the inside surface of the sleeve, e.g. of slide bearing metal, can be provided before upsetting, by any conventional method on such sleeve blanks cut out of a tube.

Compared with conventional cold extrusion, this process and the tool according to the present invention offer the advantage of the cylindrical part of the sleeve not being subjected to any further deformation, apart from a desired calibration, by the upsetting process, and the upsetting deformation being limited very exactly to the collar areas to be deformed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for the manufacture of a collar sleeve consisting essentially of a relatively hard substrate having an inner surface coating of relatively softer bearing material, said process comprising the steps of preparing a cylindrical sleeve of said substrate having an inner surface coating (4) of bearing material except in a cylindrical region (6) at one end where the collar is to be formed; placing the said prepared sleeve in a radially confining cylindrical die recess (12) with the other end in axial abutment with a first die part (13) and with the said one end projecting above the recess into a coaxial cylindrical die bore (19) of larger diameter than said recess, providing another die part (14) extending through said die bore into said recess, said other die part having a first cylindrical section (16) fitting slidably within said one end region of the sleeve and a second cylindrical section (15) extending through the remainder of said sleeve and an axially facing surface (25) above said sections in abutment with said one end of the sleeve; relatively axially moving said die parts together with upsetting pressure to shorten said sleeve and said coating simultaneously in the axial direction to calibrate the said sleeve and said coating between said confining die recess and said second cylindrical section of the other die part and to simultaneously increase in radial thickness said one sleeve end region within said coaxial die bore to form an integral radially thickened collar (7) on said one sleeve end.

2. The process defined in claim 1 wherein the finished collar sleeve is ejected from the recess by axial movement of said first die part.

3. The process defined in claim 1, wherein said prepared sleeve is formed by rolling a uniform thickness rectangular metal plate into a cylinder and fixing the abutting edges together.

4. The process defined in claim 1, wherein the said cylindrical sleeve has a substrate of steel and said inner surface coating is a metal selected from the group consisting of bronze, babbit, aluminum and other bearing metals.

5. The process defined in claim 1 wherein the step of preparing said cylindrical sleeve comprises the steps of preparing a rectangular metal plate having at least one surface coating of said bearing material and shaping the said cylindrical sleeve from said plate such that the said bearing surface coating is on the inner surface of the said cylindrical sleeve.

* * * * *

UNITED STATES PATENT OFFICE
CERTIFICATE OF CORRECTION

Patent No. 4,048,703      Dated September 20, 1977

Inventor(s) Dieter Lehnhart

It is certified that error appears in the above-identified patent and that said Letters Patent are hereby corrected as shown below:

Change the name of the Assignee from

"Geyco-Metall-Werke Daeleh & Loos GmbH" to --Glyco-Metall-Werke Daelen & Loos GmbH--

*Signed and Sealed this*

*Fourteenth* Day of *February 1978*

[SEAL]

Attest:

RUTH C. MASON      LUTRELLE F. PARKER
*Attesting Officer*      *Acting Commissioner of Patents and Trademarks*